(12) United States Patent
Hvostov et al.

(10) Patent No.: US 7,096,252 B1
(45) Date of Patent: Aug. 22, 2006

(54) SYSTEM AND METHOD FOR INTERFACING NETWORK STATION SUBSYSTEMS

(75) Inventors: Harry Hvostov, San Jose, CA (US); Anthony Fung, Pleasanton, CA (US)

(73) Assignee: STMicroelectronics, Inc., Carrollton, TX (US)

(*) Notice: Subject to any disclaimer, the term of this patent is extended or adjusted under 35 U.S.C. 154(b) by 743 days.

(21) Appl. No.: 09/684,555

(22) Filed: Oct. 5, 2000

(51) Int. Cl.
G06F 15/16 (2006.01)
G06F 9/44 (2006.01)
G06F 13/00 (2006.01)

(52) U.S. Cl. ............... 709/203; 719/315; 719/314; 719/330; 395/200.33

(58) Field of Classification Search ............. 709/203, 709/105, 222, 330; 707/202; 719/315
See application file for complete search history.

(56) References Cited

U.S. PATENT DOCUMENTS

| | | | |
|---|---|---|---|
| 5,367,609 A | 11/1994 | Hopper et al. | 395/2.87 |
| 5,832,219 A * | 11/1998 | Pettus | 709/203 |
| 6,049,826 A * | 4/2000 | Beser | 709/222 |
| 6,125,366 A | 9/2000 | Bernstein et al. | 707/103 |
| 6,182,086 B1 * | 1/2001 | Lomet et al. | 707/202 |
| 6,223,205 B1 * | 4/2001 | Harchol-Balter et al. | 709/105 |
| 6,425,017 B1 * | 7/2002 | Dievendorff et al. | 719/315 |
| 6,718,399 B1 * | 4/2004 | Chernick et al. | 719/330 |
| 6,920,636 B1 * | 7/2005 | Dievendorff et al. | 719/315 |
| 2005/0015775 A1 * | 1/2005 | Russell et al. | 719/315 |

FOREIGN PATENT DOCUMENTS

WO  WO 99/66680  12/1999

* cited by examiner

Primary Examiner—John Follansbee
Assistant Examiner—Philip Lee
(74) Attorney, Agent, or Firm—David V. Carlson; Lisa K. Jorgenson (57) ABSTRACT

A network station subsystem architecture that uses a simplified interface reference discovery method and system is provided. In one embodiment a method for managing client-server communications is disclosed that includes providing a server with functions and interface methods; providing a client with references to the interface methods; and processing client requests by invoking the interface methods on the server via the references. Ideally, the interface methods are implemented by providing the server with a table of pointers to the functions, and providing the client with references to the table of pointers, ideally at the time of design. In another embodiment, a system for managing communications in a network station for a data-over-cable network having a plurality of network stations is provided. The system includes a plurality of components in the network station, each of the plurality of components having a functionality set and a table of pointers for the functionality set; a station manager having references to the tables of pointers in the plurality of components; and an interface manager for communication with the plurality of components and the station manager, the interface manager configured to process station manager requests for functionality from the components through the interface manager via the references to the tables of pointers.

24 Claims, 2 Drawing Sheets

SYSTEM AND METHOD FOR INTERFACING NETWORK STATION SUBSYSTEMS

TECHNICAL FIELD

The present invention pertains to a method and design for network station subsystem operations, and, more particularly, to an interface reference method and system implemented in one embodiment in an Operational Support System Interface (OSSI) client manager for interaction with Cable Modem (CM) applications.

BACKGROUND OF THE INVENTION

Figure 1:
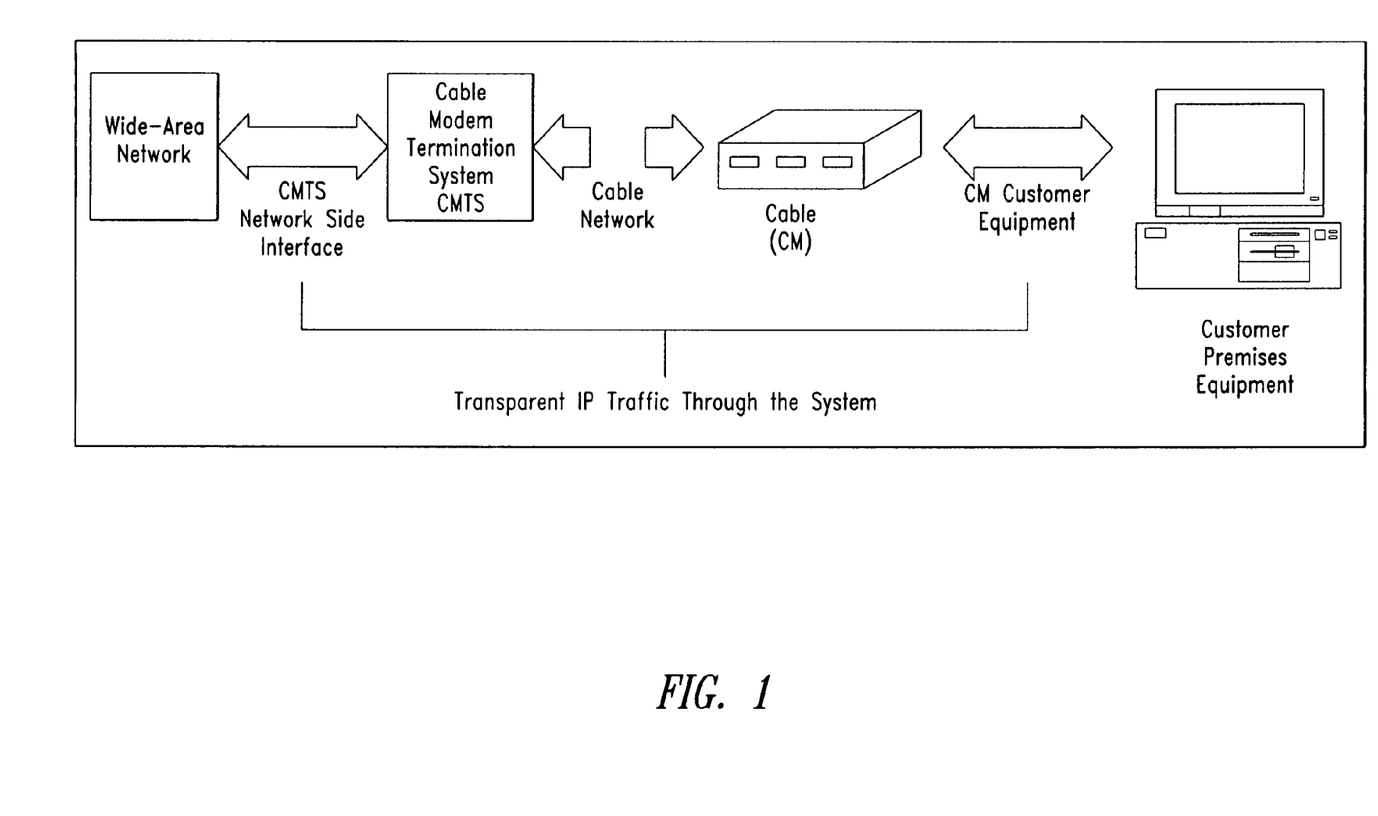
FIG. 1 is a diagram of transparent IP traffic through a data-over-cable system.

The transmission of high-speed data via cable television systems involves the bi-directional transfer of Internet Protocol (IP) traffic over a cable system, typically an all-coaxial or hybrid fiber-coax (HFC) cable network. More particularly, and with reference to FIG. 1, the transmission path over such a cable system is realized at the head end by a cable-modem-termination system (CMTS) and at each customer location by a cable modem (CM). At the head end (or hub), the interface to the data-over-cable system is known as the cable-modem-termination system network-side interface (CMTS-NSI). At the customer locations, the interface is known as the cable-modem to customer-premises-equipment interface (CMCI). The system functions to transparently transfer IP traffic between these interfaces, including, but not limited to, datagrams, Dynamic Host Configuration Protocol (DHCP), Internet Control Message Protocol (ICMP), and IP group addressing (broadcast and multicast).

As described more fully in co-pending U.S. patent application Ser. No. 09/464,637, entitled Network Station Management System and Method, which is incorporated herein in its entirety, a networking manager is a cable modem management task interacting with the application-layer Internet Protocol (IP) components in order to establish and manage Internet connectivity. These IP components can include:
1. Dynamic Host Configuration Protocol (DHCP) Client
2. Trivial File Transfer Protocol (TFTP) for Configuration Download
3. Time of Day (TOD) Client
4. TFTP for New Software Download
5. Simple Network Management Protocol (SNMP) Agent Each application-layer component is designed to run as a separate task. Each of these tasks use a messaging system (in this particular case Operating System (OS) provided messaging system) and send data to the networking manager in the body of the messages. This task design also enables the networking manager to perform other cable modem management functions (improving CPU bandwidth utilization) by checking on the application-layer task messages only as needed.

The Operations Support System Interface (OSSI) Management component is designed on the Object Oriented Design concept base. The reason for this is to allow sufficient flexibility to deal with the ever-changing OSSI requirements largely depending on control mechanisms through Management Information Base (MIB) Objects. The cable modem OSSI Client Manager is a task created at boot time. It has its own message queue to receive work from the Application-layer tasks or from the networking manager task and it sends messages to the networking manager task.

Thus, the OSSI subsystem architecture is based on a simplified component object model. Each component in this architecture can act as a server or a client. A server component implements a certain functionality set. It exposes its functionality set through interfaces. An interface is an invariant contract that defines the interaction between the server and the client components. An interface is represented by a set of methods whose signatures (function prototypes) never change but whose implementation may change.

For a client to use methods in a server's interface, a client must be able to access the functions through the interface. Hence, there is a need for a method and architecture that enables rapid and efficient client access to the functions embodied in a server interface.

SUMMARY OF THE INVENTION

The disclosed embodiments of the present invention pertain to a network station subsystem architecture that uses a simplified interface reference discovery method. More particularly, in one embodiment a method for managing client-server communications is disclosed that includes providing a server with functions and interface methods; providing a client with references to the interface methods; and processing client requests by invoking the interface methods on the server via the references. In accordance with one aspect of this embodiment, the interface methods comprise providing the server with a table of pointers to the functions, and providing the client with references to the table of pointers, ideally at the time of design.

In accordance with another embodiment, a method for network device subsystem operations is provided. The method includes implementing a first component in the network device, the first component having functions and function pointers corresponding to the functions; implementing a second component in the network device, the second component having references to the function pointers in the first component; generating a request from the first component for a function in the second component via the corresponding reference to the function pointer; and generating a response from the second component to provide the requested function to the first component.

In accordance with another embodiment of the invention, a network device is provided that includes a server component configured with a plurality of functions and function pointers for the plurality of functions; a client component configured with references to the function pointers; and an interface manager configured to receive requests for functions from the client component and to invoke the requested functions from the server component via the function pointers.

In accordance with yet another embodiment, a system for managing communications in a network station for a data-over-cable network having a plurality of network stations is provided. The system includes a plurality of components in the network station, each of the plurality of components having a functionality set and a table of pointers for the functionality set; a station manager having references to the tables of pointers in the plurality of components; and an interface manager for communication with the plurality of components and the station manager, the interface manager configured to process station manager requests for functionality from the components through the interface manager via the references to the tables of pointers.

BRIEF DESCRIPTION OF THE DRAWINGS

The foregoing will be more readily understood from the following detailed description when taken in conjunction with the accompanying drawings, wherein.

DETAILED DESCRIPTION OF THE INVENTION

A. Architectural Concepts

Figure 2:
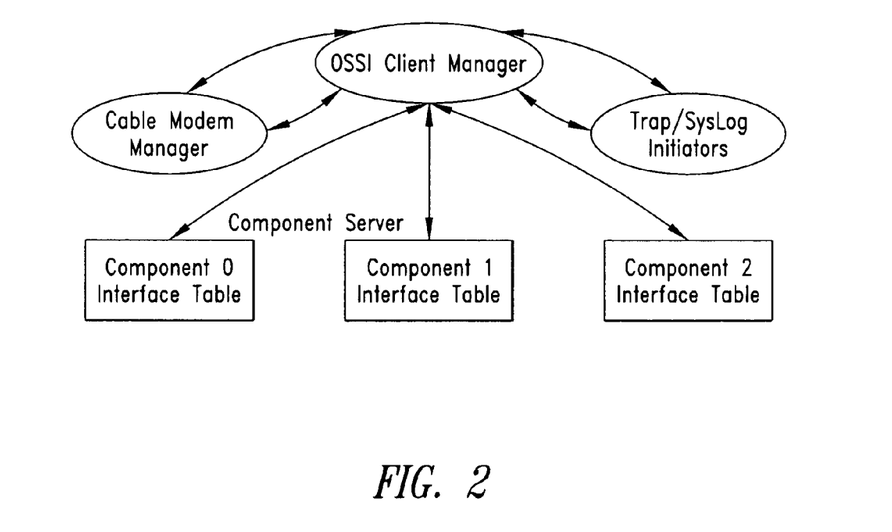
FIG. 2 is a diagram of the general interface with the OSSI client manager in accordance with one embodiment of the present invention.

The OSSI subsystem interacts with a Cable Modem Manager on a Request/Response basis. A general view of the interaction among the Cable Modem Manager and the OSSI subsystem, in this case the OSSI Client Manager, is illustrated in FIG. 2. Generally, the CM Manager is configured to generate a request to the OSSI Client Manager in the OSSI subsystem. The OSSI Client Manager is configured to process the request and to generate a response to the CM Manager.

Based on the request contents, the OSSI Client Manager determines which components need to be used in order to fulfill the request. The OSSI Client Manager then will invoke the methods in the appropriate component interfaces. In one embodiment, the CM Manager and the OSSI Client Manager reference the component functions by pointers, ideally stored in a table of pointers in each component interface. All the data storage referenced by the pointer in the request message can be in the shared system memory area.

B. Design

1. OSSI Client Manager Task

The OSSI Client Manager is designed to run as a single threaded out of process application task. The Cable Modem Manager (CMM) creates the OSSI Client Manager task during the cable modem initialization phase by calling an API ossi_task_create.

The task priority of the OSSI Client Manager task depends on the hardware and RTOS platforms. The following Table 1 shows an example of task priority assignment on two platforms.

TABLE 1

OSSI Client Manager task priority assignment

| Task Name | ST20/OS20 - JEI Build | | |
|---|---|---|---|
| | Single Ethernet | Bridge Capable | Explorer/PTV |
| ossi_client_manager | 10 | 8 | 10 |

2. Interface with OSSI Client Manager

The external interface between the Cable Modem applications and the OSSI system is based on a message system. Two message queues (Request Message Queue and Response Message Queue) are used. The Request Message Queue and the Response Message Queue are created and initialized by the OSSI Client Manager.

a. Request Message Queue

The Cable Manager requests a specific function to be performed by the OSSI Client Manager by queuing a request message into the Request Message Queue. The Cable Modem Manager can queue multiple request messages in the Request Message Queue. But the OSSI Client Manager can only service one request message at a time (based on first comes first serves policy). The general format of the Request Message is defined in Table 2.

TABLE 2

The general format of the Request Message

| word | 31 30 29 28 26 26 25 24 23 22 21 20 19 18 17 16 | 15 14 13 12 11 10 9 8 7 6 5 4 3 2 1 0 |
|---|---|---|
| 00 | Request Function Code | Function Specific Parameter 0 |
| | Component ID    Interface ID | |
| 01 | | Function Specific Parameter 1 |
| 02 | | Function Specific Parameter 2 |
| 03 | | Function Specific Parameter 3 | i. Request Function Code (word 0, bits 31–16)

The Request Message Code is composed of two ID fields (Component and Interface). These two ID fields are mainly for OSSI Client Manager internal use. When the OSSI Client Manager receives the Request Message, the OSSI Client Manager picks up the Component ID from the Request function code to determine which Management Component will respond to this request from the OSSI Management Component table. Once the OSSI Management component has been identified. The OSSI Client Manager picks up the Interface ID from the Request Function Code. The OSSI Client Manager uses the Interface ID as a reference pointer within the identified Component Interface Table to fetch the function pointer of the interface method to be invoked. Each request function code is uniquely defined in Table 3.

TABLE 3

Request Function Codes

| Request Function | Component ID | Interface ID | Request Function Code |
|---|---|---|---|
| Software Upgrade | 01-Configuration Management | 00 | 0x0100 |
| Enable CPE/CM IP Host Communication | 02-Fault Management | 00 | 0x0200 |
| Start CPE/CM IP Host Communication | 02-Fault Management | 01 | 0x0201 |
| Event Notification | 02-Fault Management | 02 | 0x0202 |
| Clean-Up Event Log | 02-Fault Management | 03 | 0x0203 |
| Copy Event Log from NVS to DRAM | 02-Fault Management | 04 | 0x0204 |
| Copy Event Log from DRAM to NVS | 02-Fault Management | 05 | 0x0205 |
| Reset Event Log | 02-Fault Management | 06 | 0x0206 | ii. Function Specific Parameter 0 (word 0, bits 15–0)

Function Specific Parameter 1 (word 1, bits 31–0)

Function Specific Parameter 2 (word 2, bits 31–0)

Function Specific Parameter 3 (word 2, bits 31–0)

All four Function Specific Parameter fields are used to pass any input parameters required for the execution of the requesting function. For those not used parameter fields should be set with a value of zero. Since the OSSI components execute in-process, no marshaling and unmarshaling of the parameters is required.

b. Response Message Queue

The OSSI Client Manager returns the completion status and response information of the requested functions (besides the Event Notification request) in the response message. All unused fields should be set with a value of zero. The general format of the Response Message is defined in Table 4.

TABLE 4

The general format of the Response Message

| word | 31 30 29 28 26 26 25 24 23 22 21 20 19 18 17 16 | 15 14 13 12 11 10 9 8 7 6 5 4 3 2 1 0 |
|---|---|---|
| 00 | Requested Function Code | Completion Status |
| 01 | Response Information 0 | |
| 02 | Response Information 1 | |
| 03 | Not Used (0) | |

3. Supported Request Functions a. Software Upgrade (0x0100)

When the Cable Modem Manager recognizes there is a need for software upgrade, either from the Configuration file or from the SNMP Manager, the Cable Modem Manager sends this Software Upgrade request message to the OSSI Client Manager. It also specifies a pointer to the TFTP server IP address in Function Specific Parameter 1 and a pointer to the software upgrade image's name in Function Specific Parameter 2 in the Request Message. The format of the Software Download from the Configuration file Request Message is defined in Table 5.

TABLE 5

The format of Software Upgrade Request Message

| Word | 31 30 29 28 26 26 25 24 23 22 21 20 19 18 17 1615 14 13 12 11 10 9 8 7 6 5 4 3 2 1 0 |
|---|---|
| 00 | 0x0100                   Not Used (0) |
| 01 | Pointer to TFTP Server IP Address |
| 02 | Pointer to Software Upgrade Image's Name |
| 03 | Not Used (0) |

Under normal operation, no Software Upgrade Response Message will be returned to the Cable Modem Manager. The Cable Modem will reboot itself from its new software upgrade image. The OSSI Client Manager only returns a Response Message to the Cable Modem Manager when there is an error detected during the software upgrade process. The format of the Software Upgrade Response Message is defined in Table 6.

TABLE 6

The format of Software Upgrade file Response Message

| Word | 31 30 29 28 26 26 25 24 23 22 21 20 19 18 17 1615 14 13 12 11 10 9 8 7 6 5 4 3 2 1 0 |
|---|---|
| 00 | 0x0100        0x0000 - Completed with no error. |
|  | 0x0001 - Software Image not found. |
|  | 0x0002 - Incompatible Software Version. |
|  | 0x0003 - Incompatible Hardware Version. |
|  | 0x0004 - Insufficient memory allocation. |
|  | 0x0005 - Timeout on TFTP. |
|  | 0x0006 - Error in header file. |
|  | 0x0007 - Invalid Checksum. |
|  | 0x0008 - Same image, no download needed. |
| 01 | Not Used (0) |
| 02 | Not Used (0) |
| 03 | Not Used (0) | b. Enable CPE/CM IP Host Communication (0x0200)

When the Cable Modem Manager decides to enable communication between the CPE and the CM IP Host, the Cable Modem Manger sends an Enable CPE/CM IP Host Communication request message to the OSSI Client Manager. The OSSI Client Manager sets an OSSICpeIpHostComm bit in the OSSI status word. The format of the Enable CPE/CM IP Host Communication Request Message is defined in Table 7.

TABLE 7

The format of Enable CPE/CM IP Host Communication Request Message

Word 31 30 29 28 26 26 25 24 23 22 21 20 19 18 17 1615 14 13 12 11 10 9 8 7 6 5 4 3 2 1 0

| Word | | |
|---|---|---|
| 00 | 0x0200 | Not Used (0) |
| 01 | | Not Used (0) |
| 02 | | Not Used (0) |
| 03 | | Not Used (0) |

At the completion of the Enable CPE/CM IP Host Communication request, the OSSI Client Manager returns a Response Message to the Cable Modem Manager. The format of the Enable CPE/CM IP Host Communication Response Message is defined in Table 8.

TABLE 8

The format of Enable CPE/CM IP Host Communication Response Message

Word 31 30 29 28 26 26 25 24 23 22 21 20 19 18 17 1615 14 13 12 11 10 9 8 7 6 5 4 3 2 1 0

| Word | | |
|---|---|---|
| 00 | 0x0200 | 0x0000 - Completed with no error. |
| 01 | | Not Used (0) |
| 02 | | Not Used (0) |
| 03 | | Not Used (0) | c. Start CPE/CM IP Host Communication (0x0201)

When the Cable Modem Manager decides to activate the CPE/CM IP Host Communication, the Cable Modem Manager sends a Start CPE/CM IP Host Communication request message to the OSSI Client Manager. The Start CPE/CM IP Host Communication interface enables communication between the CPE and the Cable Modem IP Host by calling the Bridge component provided by the API function br_bridge_set ( ). After setting up the communication between the CPE and the Cable Modem IP Host, the OSSICpeIpHostComm bit will be reset in the OSSI status word. The format of the Start CPE/CM IP Host Communication Request Message is defined in Table 9.

TABLE 9

The format of Start CPE/CM IP Host Communication Request Message

Word 31 30 29 28 26 26 25 24 23 22 21 20 19 18 17 1615 14 13 12 11 10 9 8 7 6 5 4 3 2 1 0

| Word | | |
|---|---|---|
| 00 | 0x0200 | Not Used (0) |
| 01 | | Not Used (0) |
| 02 | | Not Used (0) |
| 03 | | Not Used (0) |

At the completion of the Start CPE/CM IP Host Communication request, the OSSI Client Manager returns a Response Message to the requester. The format of the Start CPE/CM IP Host Communication Response Message is defined in Table 10.

TABLE 10

The format of Start CPE/CM IP Host Communication Response Message

| Word | 31 30 29 28 26 26 25 24 23 22 21 20 19 18 17 16 | 15 14 13 12 11 10 9 8 7 6 5 4 3 2 1 0 |
|---|---|---|
| 00 | 0x0201 | 0x0000 - Completed with no error. |
| | | 0x0009 - OSSICpeIpHostComm not set. |
| | | 0x000A - CPE/IP Host connection failed |
| 01 | | Not Used (0) |
| 02 | | Not Used (0) |
| 03 | | Not Used (0) | d. Event Notification (0x0202)

Any Cable Modem component can send trap, syslog, enterprise trap, and event log information to remote network hosts by sending an Event Notification request message to the OSSI Client Manager. A predefined event code will be specified in the function specific parameter 1 field. When the Event Code in the parameter 1 specifies this event is for sending Enterprise Trap, the requestor needs to specify the predefined Enterprise Trap number in the parameter 2 field. When sending an enterprise trap and the reported MIB object is an element of MIB object table, an interface index is required in the function specific parameter 3 field such that OSSI can reference that particular MIB object in the MIB object table. The OSSI Client Manager determines the appropriate action (trap, syslog or event log) to be taken by examining the event code. Any trap or syslog that cannot be reported at that time will be logged in the event log. The format of the Event Notification Request Message is defined in Table 11.

TABLE 11

The format of Event Notification Request Message

| word | 31 30 29 28 26 26 25 24 23 22 21 20 19 18 17 16 | 15 14 13 12 11 10 9 8 7 6 5 4 3 2 1 0 |
|---|---|---|
| 00 | 0x0202 | Not Used (0) |
| 01 | Event Code | |
| 02 | Enterprise Trap number | |
| 03 | Interface Index within the mib object table (for Enterprise Trap only) | |

At the completion of the Event Notification request, no Response Message is returned to the requester.

e. Clean-Up Event Log (0x0203)

An unexpected power loss can garble a log entry in the event log. The Cable Modem Manager can recognize a garbled event log entry by checking the OSSINvsLogWritePending bit set in the OSSI status word during a subsequent system boot time and it must remove an incomplete log entry. The Cable Modem Manager sends this Clean-Up Event Log request message to the OSSI Client Manager. The OSSI Client Manager will remove the garbled log entry from the event log and reset the OSSINvsLogWritePending bit in the OSSI status word. The format of the Clean-Up Event Log Request Message is defined in Table 12.

TABLE 12

The format of Clean-Up Event Log Request Message

| word | 31 30 29 28 26 26 25 24 23 22 21 20 19 18 17 16 | 15 14 13 12 11 10 9 8 7 6 5 4 3 2 1 0 |
|---|---|---|
| 00 | 0x0203 | Not Used (0) |
| 01 | | Not Used (0) |
| 02 | | Not Used (0) |
| 03 | | Not Used (0) |

At the completion of the Clean-Up Event Log request, the OSSI Client Manager returns a Response Message to the Cable Modem Manager. The format of the Clean-Up Event Log Response Message is defined in Table 13.

TABLE 13

The format of Clean-Up Event Log Response Message word 31 30 29 28 26 26 25 24 23 22 21 20 19 18 17 1615 14 13 12 11 10 9 8 7 6 5 4 3 2 1 0

| | | |
|---|---|---|
| 00 | 0x0203 | 0x0000 - Completed with no error. |
| 01 | | Not Used (0) |
| 02 | | Not Used (0) |
| 03 | | Not Used (0) | f. Copy Event Log from NVS to DRAM

In order to synchronize the event log in the system memory (DRAM) with Non-Volatile Store Memory (NVS) during the Cable Modem initialization, the Cable Modem Manager sends this Copy Event Log from Non-Volatile Store Memory (NVS) to the system memory (DRAM) request message. The format of the Copy Event Log from NVS to DRAM is defined in the Table 14.

TABLE 14

The format of Copy Event Log from NVS to DRAM Request Message word 31 30 29 28 26 26 25 24 23 22 21 20 19 18 17 1615 14 13 12 11 10 9 8 7 6 5 4 3 2 1 0

| | | |
|---|---|---|
| 00 | 0x0204 | Not Used (0) |
| 01 | | Not Used (0) |
| 02 | | Not Used (0) |
| 03 | | Not Used (0) |

At the completion of the Copy Event Log from NVS to DRAM request, the OSSI Client Manager returns a Response Message to the Cable Modem Manager. The format of the Copy Event Log from NVS to DRAM Response Message is defined in Table 15.

TABLE 15

The format of Copy Event Log from NVS to DRAM Response Message

Word 31 30 29 28 26 26 25 24 23 22 21 20 19 18 17 1615 14 13 12 11 10 9 8 7 6 5 4 3 2 1 0

| | | |
|---|---|---|
| 00 | 0x0204 | 0x0000 - Completed with no error. |
| 01 | | Not Used (0) |
| 02 | | Not Used (0) |
| 03 | | Not Used (0) | g. Copy Event Log from DRAM to NVS

In order to elongate the life of the Non-Volatile Store Memory, it is necessary to reduce the frequency of writing data to the Non-Volatile Store Memory (NVS). All event logs are stored in the system memory (DRAM) rather than in the Non-Volatile Store Memory (NVS) when the logging occurs. The Cable Modem synchronizes the event logs in the system memory (DRAM) and the Non-Volatile Store Memory (NVS) periodically every 30 seconds by writing back to the NVS if there is any change in the event logs. The format of the Copy of Event Log from DRAM to NVS Request Message is defined in Table 16.

TABLE 16

The format of Copy Event Log from DRAM to NVS Request Message word 31 30 29 28 26 26 25 24 23 22 21 20 19 18 17 1615 14 13 12 11 10 9 8 7 6 5 4 3 2 1 0

| word | bits 31–16 | bits 15–0 |
|---|---|---|
| 00 | 0x0205 | Not Used (0) |
| 01 | Not Used (0) | |
| 02 | Not Used (0) | |
| 03 | Not Used (0) | |

At the completion of the Copy Event Log from the DRAM to NVS request, the OSSI Client Manager returns a Response Message to the Cable Modem Manager. The format of the Copy Event Log from DRAM to NVS Response Message is defined in Table 17.

TABLE 17

The format of Copy Event Log from DRAM to NVS Response Message word 31 30 29 28 26 26 25 24 23 22 21 20 19 18 17 1615 14 13 12 11 10 9 8 7 6 5 4 3 2 1 0

| word | bits 31–16 | bits 15–0 |
|---|---|---|
| 00 | 0x0205 | 0x0000 - Completed with no error. |
| 01 | Not Used (0) | |
| 02 | Not Used (0) | |
| 03 | Not Used (0) | | h. Reset Event Log

When the Cable Manager receives a SNMP Set Request for the docsDevEvControl mib object with a value of resetlog (1), the Cable Manager sends this Reset Event Log request message to the OSSI Client Manager. The format of the Reset Event Log Request Message is defined in Table 18.

TABLE 18

The format of Reset Event Log Request Message word 31 30 29 28 26 26 25 24 23 22 21 20 19 18 17 1615 14 13 12 11 10 9 8 7 6 5 4 3 2 1 0

| word | bits 31–16 | bits 15–0 |
|---|---|---|
| 00 | 0x0206 | Not Used (0) |
| 01 | Not Used (0) | |
| 02 | Not Used (0) | |
| 03 | Not Used (0) | |

At the completion of the Reset Event Log request, the OSSI Client Manager returns a Response Message to the Cable Modem Manager. The format of the Reset Event Log Response Message is defined in Table 19.

TABLE 19

The format of Reset Event Log Response Message word 31 30 29 28 26 26 25 24 23 22 21 20 19 18 17 1615 14 13 12 11 10 9 8 7 6 5 4 3 2 1 0

| word | bits 31–16 | bits 15–0 |
|---|---|---|
| 00 | 0x0206 | 0x0000 - Completed with no error. |
| 01 | Not Used (0) | |
| 02 | Not Used (0) | |
| 03 | Not Used (0) | |

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A method for client-server communications, comprising:
   implementing an interfacing method internal to a cable modem, comprising:
   providing the cable modem with server components and configuring the server components to implement a set of functions;
   providing the server components with a set of interface methods for initiating execution of the functions, wherein the set of interface methods correspond to the set of functions;
   providing a client component with references to the interface methods, wherein the client component indirectly invokes one of the interface methods by requesting that an interface manager, created by the client component during the initialization of the cable modem, invoke the interface method on behalf of the client component, and wherein the server components, client component, and interface manager execute within the cable modem;
   sending client component requests to the interface manager via a first message queue, wherein each request includes a component identifier, an interface identifier, and a function parameter;
   processing the client component requests by invoking the interface method corresponding to the interface identifier of the server component corresponding to the component identifier included in the request and passing the function parameter to the server component; and
   providing a response message regarding the execution of the interface method to the client component via a second message queue, wherein the response message comprises a status.

2. The method of claim 1, wherein configuring server components with functionality and providing the interface methods comprises providing a table of pointers for the function.

3. The method of claim 2, wherein providing a client component with references to the interface methods comprises providing reference to the table of pointers.

4. The method of claim 3, wherein processing client component requests comprises generating requests from the client component for functions from the server components by referencing the table of pointers for the requested functions and generating responses from the server components to provide the functions requested through the table of pointers.

5. A method for network device subsystem operations, comprising:
   implementing an interfacing method internal to a cable modem, comprising:
   implementing a first component in the cable modem, the first component having functions and function pointers corresponding to the functions;
   implementing a second component in the cable modem, the second component having references to the function pointers of the first component, wherein the second component indirectly invokes one of the functions by requesting that an interface manager, created by the second component during the initialization of the cable modem, invoke the function on behalf of the second component, and wherein the first component, second component, and interface manager execute within the cable modem;
   receiving a request via a message queue from the second component for a function in the first component via a corresponding reference to the function pointer, wherein the request includes a component identifier, an interface identifier, and a function parameter;
   processing the second component request by invoking the interface method corresponding to the interface identifier of the first component that corresponds to the component identifier included in the request and passing the function parameter to the first component; and
   generating a response from the first component to provide the requested function result, based on the function parameter, to the interface manager, thereafter the interface manager relaying the result to the second component.

6. The method of claim 5, wherein implementing the first component comprises providing a table of function pointers.

7. The method of claim 6, wherein implementing the second component comprises providing references to the table of function pointers.

8. The method of claim 7, wherein receiving a request from the second component comprises referencing the table of pointers for the requested function.

9. The method of claim 8, wherein generating a response from the first component comprises receiving the request from the second component, invoking the requested function via the table of pointers, and providing the function parameter to the first component.

10. A method of facilitating communications in a network station for a data-over-cable network having a plurality of network stations, the method comprising:
    providing a plurality of components in a cable modem, each of the plurality of components having a functionality set and a table of pointers for the functionality set;
    providing a station manager in the cable modem having references to the tables of pointers in the plurality of components;
    providing an interface manager, created by the station manager during initialization of the cable modem, for communication via a message queue with the station manager, wherein the station manager indirectly invokes one of the component functions by requesting that the interface manager invoke the function on behalf of the station manager, and wherein the components, station manager, and interface manager execute within the cable modem;
    generating requests at the station manager for functionality through the references to the tables of pointers and sending the requests for functionality to the interface manager via the message queue, wherein each request includes a component identifier, an interface identifier, and a function parameter; and
    processing station manager requests for functionality from the plurality of components through the interface manager via the references to the tables of pointers.

11. The method of claim 10, wherein processing station manager requests comprises:
    generating requests at the station manager for functionality through the references to the tables of pointers and sending the requests for functionality to the interface manager via the message queue, wherein each request includes a component identifier, an interface identifier, and a function parameter;

receiving the requests for functionality at the interface manager and invoking the component functionality from the requested functionality sets via the table of pointers; and providing the function parameter to the component.

12. The method of claim 11, wherein the requests for functionality are processed serially by the interface manager.

13. The method of claim 11, wherein the requests for functionality are processed by the interface manager on a first-come first-served basis.

14. The method of claim 11, wherein providing the plurality of components includes storing data referenced by the pointers are stored in a shared memory area.

15. A cable modem, comprising:

a server component configured with a plurality of functions and function pointers for the plurality of functions and configured to execute within the cable modem;

a client component configured with references to the function pointers and configured to execute within the cable modem; and an interface manager, created by the client component during the initialization of the cable modem, configured to execute within the cable modem and configured to receive requests for functions from the client component via a message queue and to invoke the requested functions on behalf of the client component from the server component via the function pointers, wherein each request includes a component identifier, an interface identifier, and a function parameter, and to process the client component request by invoking an interface method corresponding to the interface identifier of the server component that corresponds to the component identifier included in the request and passing the function parameter to the server component.

16. The device of claim 15, wherein the client component is configured to request server component function execution through the interface manager by providing the reference to the function pointer and a function parameter.

17. The device of claim 16, wherein the interface manager is configured to receive the references to function pointers and to determine the requested functions to invoke through the references to the function pointers.

18. The device of claim 15, wherein the server component is configured to include a table of pointers to the functions.

19. The device of claim 18, wherein the client component is configured to reference the functions through the table of pointers.

20. A system for facilitating communications within a network station for a data-over-cable network having a plurality of network stations, the system comprising:

a plurality of components in a cable modem, each of the plurality of components having a functionality set and a table of pointers for the functionality set;

a station manager in the cable modem having references to the tables of pointers in the plurality of components; and an interface manager, created by the station manager during initialization of the cable modem, for communication via a message queue with the station manager, the interface manager configured to process station manager requests for functionality from the plurality of components through the interface manager via the references to the tables of pointers, wherein the station manger indirectly invokes one of the component functions by requesting that the interface manager invoke the function on behalf of the station manager, and wherein the components, station manager, and interface manager execute within the cable modem, wherein each request includes a component identifier, an interface identifier, and a function parameter, and processing the station manager request comprises invoking an interface method corresponding to the interface identifier of the component that corresponds to the component identifier included in the request and passing the function parameter to the component.

21. The system of claim 20, wherein the station manager is configured to generate requests for functionality through the references to the tables of pointers and sending the requests for functionality to the interface manager; and the interface manager is configured to receive the requests for functionality and to invoke the functionality from the requested functionality sets via the table of pointers.

22. The system of claim 21, wherein the network station is a cable modem, the station manager is a cable modem manager, and the interface manager is an OSSI client manager.

23. The system of claim 20, wherein the interface manager is configured to process requests for functionality on a first-come first-served basis.

24. The system of claim 20, further comprising a shared memory area for storing all data referenced by the pointers.

* * * * *